United States Patent
Lee et al.

[11] Patent Number: 5,822,496
[45] Date of Patent: Oct. 13, 1998

[54] FUZZY OPERATION AND DEFUZZIFICATION NETWORK APPARATUS

[75] Inventors: Kwang Hyung Lee; Kyu Ho Park; Yeong Dal Kim, all of Taejon, Rep. of Korea

[73] Assignee: Korea Telecommunication Authority, Seoul, Rep. of Korea

[21] Appl. No.: 908,124

[22] Filed: Aug. 11, 1997

Related U.S. Application Data

[63] Continuation of Ser. No. 459,718, Jun. 2, 1995, abandoned.

[30] Foreign Application Priority Data

Jun. 3, 1994 [KR] Rep. of Korea ............... 1994 12598
Jun. 3, 1994 [KR] Rep. of Korea ............... 1994 12597

[51] Int. Cl.$^6$ ..................................... G06G 7/00
[52] U.S. Cl. ................... 395/3; 395/61; 395/900
[58] Field of Search ................ 395/61, 900, 51

[56] References Cited

U.S. PATENT DOCUMENTS 5,388,190 2/1995 Nakano ..................... 395/61
5,561,739 10/1996 Muraji ........................ 395/3

OTHER PUBLICATIONS

Kato, Yaunori, et al. "Conjunction and Disjunction with Synergistic Effect." Fuzzy Systems, International Conference 1993, pp. 225–230.

*Primary Examiner*—Robert W. Downs
*Assistant Examiner*—Jason W. Rhodes
*Attorney, Agent, or Firm*—Merchant, Gould, Smith, Edell, Welter & Schmidt, P.A.

[57] ABSTRACT

A fuzzy operation apparatus which can supply various fuzzy operators by combining basic operators provided by hardware with microprograms, performs fuzzy operations in parallel by connecting a plurality of fuzzy operation portions using a network, and performs parallel defuzzification of the result of fuzzy operations stored in the fuzzy operation portions throughout the network. The present invention establishes a network between fuzzy operation portions, performs fuzzy operation in parallel at a plurality of fuzzy operation portions, and defuzzifies each element of a fuzzy set dispersed and stored in the fuzzy operation portions such that defuzzification speed is fast. Also, since there is no need for an exclusive defuzzification processor, the cost of the system is low.

5 Claims, 11 Drawing Sheets

| OPERATOR | FUNCTION | OP CODE | FLAG | | |
|---|---|---|---|---|---|
| NOP | no operation | OOXX XXX XXX XXX | | | |
| ADD | add | 0100 S1 S2 D | C | Z | O |
| ADC | add with carry | 0101 S1 S2 D | C | Z | O |
| SUB | subtraction | 0110 S1 S2 D | C | Z | O |
| AAS | add and shift | 0111 S1 S2 D | C | Z | O |
| MIN | minimum | 1000 S1 S2 D | E | L | O |
| MAX | maximum | 1001 S1 S2 D | E | L | O |
| SHL | shift left | 1010 S1 S2 D | C | Z | O |
| SHR | shift right | 1011 S1 S2 D | C | Z | O |
| MOV | move | 1100 S1 000 D | | Z | O |
| MOV.C | conditional move(carry) | 1101 S1 S2 D | | Z | O |
| MOV.Z | conditional move(zero) | 1110 S1 S2 D | | Z | O |
| MOV.O | conditional move(one) | 1111 S1 S2 D | | Z | O |

FIG. 5

| No. | $T_N(x,y)$ | $T^*_N(x,y)$ | $N_N(x)$ |
|---|---|---|---|
| 1 | $MIN(x,y)$ | $MAX(x,y)$ | $1-x$ |
| 2 | $x \cdot y$ | $x+y-xy$ | $1-x$ |
| 3 | $MAX(x+y-1, 0)$ | $MIN(x+y, 1)$ | $1-x$ |
| 4 | $\dfrac{xy}{x+y-xy}$ | $\dfrac{x+y-2xy}{1-xy}$ | $1-x$ |
| 5 | $\begin{cases} x, & \text{if } y=1 \\ y, & \text{if } x=1 \\ 0, & \text{otherwise} \end{cases}$ | $\begin{cases} x, & \text{if } y=1 \\ y, & \text{if } x=1 \\ 0, & \text{otherwise} \end{cases}$ | $1-x$ |
| 6 | $\dfrac{\lambda xy}{1-(1-\lambda)(x+y-xy)}$ | $\dfrac{\lambda(x+y)+xy(1-2\lambda)}{\lambda+xy(1-\lambda)}$ | $1-x$ |
| 7 | $MAX(1-((1-x)^p+((1-y)^p)^{\frac{1}{p}}, 0)$ | $MIN((x^p+y^p)^{\frac{1}{p}}, 1)$ | $1-x$ |
| 8 | $\dfrac{1}{1+[(\frac{1}{x}-1)^\lambda+(\frac{1}{y}-1)^\lambda]^{\frac{1}{\lambda}}}$ | $\dfrac{1}{1+[(\frac{1}{x}-1)^{-\lambda}+(\frac{1}{y}-1)^{-\lambda}]^{-\frac{1}{\lambda}}}$ | $1-x$ |
| 9 | $\dfrac{xy}{MAX(x,y,\lambda)}$ | $1-\dfrac{(1-x)(1-y)}{MAX(1-x,1-y,\lambda)}$ | $1-x$ |
| 10 | $MAX\left(\dfrac{x+y-1+\lambda xy}{1+\lambda}, 0\right)$ | $MIN(x+y+\lambda xy, 1)$ | $\dfrac{1-x}{1+\lambda x}$ |
| 11 | $MAX((1+\lambda)(x+y-1)-\lambda xy, 0)$ | $MIN(x+y+\lambda xy, 1)$ | $1-x$ |

FIG. 6

| FUZZY OPERATION | MICRO PROGRAM | |
|---|---|---|
| 1. LOGICAL PRODUCT | MIN | R0,R1,R2 |
| 2. LOGICAL SUM | MAX | R0,R1,R2 |
| 3. ALGEBRAIC PRODUCT | MUL | R0,R1,R2 |
| 4. ALGEBRAIC SUM | SUB<br>MUL<br>ADD | 1,R0,R4<br>R1,R4,R2<br>R0,R2,R2 |
| 5. BOUNDED PRODUCT | ADD<br>MOV.C<br>SH1<br>MOV.C<br>SHR<br>MAX | R0,R1,R1<br>1,0,R0<br>R1,R1<br>R1,0,R1<br>SHR R1,R1<br>R0,R1,R2 |
| 6. BOUNDED SUM | ADD<br>MOV.C<br>MOV<br>MOV.O | R0,R1,R2<br>1,R2,R2<br>R2,R2<br>1,R2,R2 |
| 7. DRASTIC PRODUCT | MOV<br>MOV.O<br>MOV<br>MOV.O | R1,R2<br>R0,0,R2<br>R0,R0<br>R1,R2,R2 |
| 8. DRASTIC SUM | MOV<br>MOV.Z<br>MOV<br>MOV.Z | R1,R1<br>R0,0,R2<br>R0,R0<br>R1,R2,R2 |
| MUL:<br>(MUL R0,R1,R2) | MOV<br>AAS<br>AAS<br>AAS<br>AAS<br>AAS<br>AAS<br>AAS<br>AAS | 0,R2<br>R0,R1,R2<br>R0,R1,R2<br>R0,R1,R2<br>R0,R1,R2<br>R0,R1,R2<br>R0,R1,R2<br>R0,R1,R2<br>R0,R1,R2 |

FIG. 7
MICRO INSTRUCTION FLOWCHART

ADD x,y,y  →  y ← x+y

MOV.C 1,0,x  →  CARRY ISSUE?
- → x ← 1
- → x ← 0

SHL y,y  →  y<<1

MOV.C y,0,y  →  CARRY ISSUE?
- → y ← y
- → y ← 0

SHR y,y  →  y>>1

MAX x,y,z  →  z ← MAX(x,y)

FIG. 8

| TRN | Unconditional Transfer |
|---|---|
| TRN.C | Conditional Transfer(Carry) |
| TRN.O | Conditional Transfer(One) |
| TRN.Z | Conditional Transfer(Zero) |

| FUZZY OPERATION | 0 | 1 | 2 | 3 | 4 | 5 | 6 | 7 | 8 | 9 | 10 | 11 | 12 | 13 | 14 | 15 | INDEX |
|---|---|---|---|---|---|---|---|---|---|---|---|---|---|---|---|---|---|
| ELEMENT VALUE | 0 | 0 | 3 | 3 | 5 | 8 | 8 | 8 | 8 | 8 | 6 | 6 | 6 | 3 | 0 | 0 | TRANSMIT · SUM |
| | | 0 | 3 | 6 | 8 | 13 | 16 | 16 | 16 | 16 | 14 | 12 | 12 | 9 | 3 | 0 | TRANSMIT · SUM |
| | | | 3 | 6 | 11 | 16 | 21 | 24 | 24 | 24 | 22 | 20 | 18 | 15 | 9 | 3 | TRANSMIT · SUM |
| | | | | 6 | 11 | 19 | 24 | 29 | 32 | 32 | 30 | 28 | 26 | 21 | 15 | 9 | TRANSMIT · SUM |
| | | | | | 11 | 19 | 27 | 32 | 37 | 40 | 38 | 36 | 34 | 29 | 21 | 15 | TRANSMIT · SUM |
| | | | | | | 19 | 27 | 35 | 40 | 45 | 46 | 44 | 42 | 37 | 29 | 21 | TRANSMIT · SUM |
| | | | | | | | 27 | 35 | 43 | 48 | 51 | 52 | 50 | 45 | 37 | 29 | TRANSMIT · SUM |
| | | | | | | | | 35 | 43 | 51 | 54 | 57 | 58 | 53 | 45 | 37 | TRANSMIT · SUM |
| | | | | | | | | | 43 | 51 | 57 | 60 | 63 | 61 | 53 | 45 | TRANSMIT · SUM |
| | | | | | | | | | | 51 | 57 | 63 | 66 | 66 | 61 | 53 | TRANSMIT · SUM |
| | | | | | | | | | | | 57 | 63 | 69 | 69 | 66 | 61 | TRANSMIT · SUM |
| | | | | | | | | | | | | 63 | 69 | 72 | 69 | 66 | TRANSMIT · SUM |
| | | | | | | | | | | | | | 69 | 72 | 72 | 69 | TRANSMIT · SUM |
| | | | | | | | | | | | | | | 72 | 72 | 72 | TRANSMIT · SUM |
| | | | | | | | | | | | | | | | 72 | 72 | TRANSMIT · SUM |
| | | | | | | | | | | | | | | | | 72 | TRANSMIT · SUM |
| | 72 | 72 | 72 | 72 | 72 | 72 | 72 | 72 | 72 | 72 | 72 | 72 | 72 | 72 | 72 | 72 | BROADCASTING |
| | 36 | 36 | 36 | 36 | 36 | 36 | 36 | 36 | 36 | 36 | 36 | 36 | 36 | 36 | 36 | 36 | DIVIDED BY 2 |
| | 7 | | | | | | | | | | | | | | | → | COMPARE · TRANSMIT |

FUZZY OPERATION AND DEFUZZIFICATION NETWORK APPARATUS

This is a Continuation of application Ser. No. 08/459,718, filed Jun. 2, 1995, now abandoned.

BACKGROUND OF THE INVENTION

1. Technical Field

The present invention relates to a fuzzy operation apparatus, and more particularly relates to a fuzzy operation apparatus which can supply various fuzzy operators by combining basic operators provided by hardware with microprograms, performs fuzzy operations in parallel by connecting a plurality of fuzzy operation portions so that they form a network, and perform, in parallel, defuzzification of the result of a fuzzy operation stored in the fuzzy operation portions throughout the network.

2. Prior Art

Generally, a fuzzy hardware, which processes fuzzy information has a fuzzy operation apparatus performing fuzzy operations, and conventional operation apparatus performs limited functions which provide only a specific fuzzy operator.

In other words, most conventional fuzzy operation apparatuses are used in a fuzzy inference chip which provides only logic operators (MIN, MAX) of fuzzy operators, which perform Mamdani's fuzzy inference.

However, there are various fuzzy operators, and each operator has distinct characteristics. A fuzzy operation apparatus providing various operators is needed as the field of the fuzzy application becomes wider.

In order to provide various operators, in the case where hardware elements are added, there is a problem in that the costs are greater and the size of the hardware becomes larger. Also, when fuzzy inference results are applied to a system to be controlled, and since a fuzzy set cannot be used directly as a control input after fuzzy inference, the results must be applied to the system after performing a defuzzification operation which produces a specific value.

Figure 1:
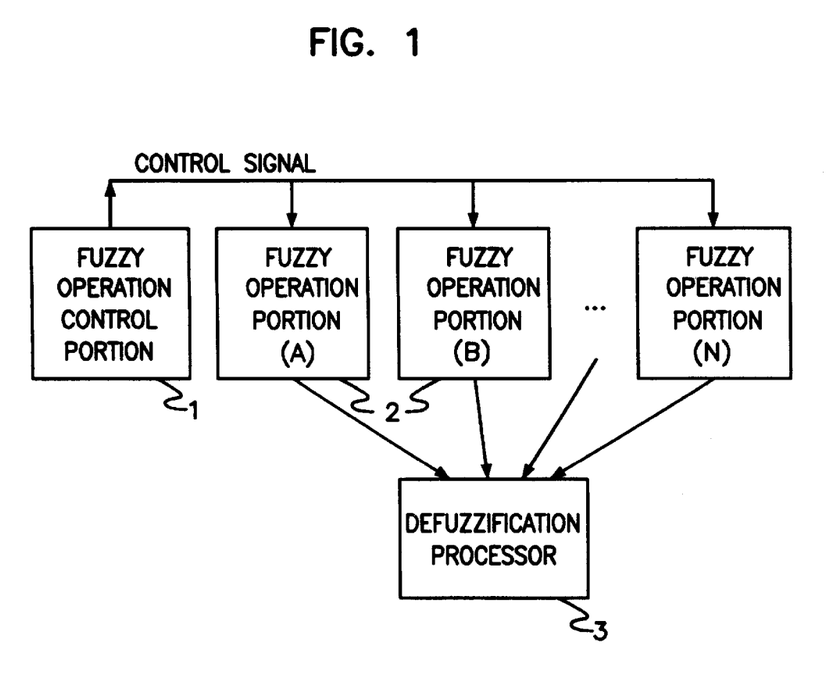
FIG. 1 is a block diagram in accordance with a conventional fuzzy operation apparatus.

In a conventional system, as shown in the FIG. 1 defuzzification operations are performed sequentially after collecting the fuzzy-operated results (each element of a fuzzy set is dispersed and stored in a fuzzy operation portion 2) into an exclusive defuzzification processor 3, in accordance with a control signal of a fuzzy operation control portion 1.

Therefore, each fuzzy operation portion 2 must transmit data to the exclusive defuzzification processor 3 for defuzzifying operation, and the exclusive defuzzification processor 3 has to process data transmitted from the fuzzy operation portion 2 sequentially. This makes the defuzzification process slow and the cost becomes higher by using an exclusive defuzzification processor 3.

SUMMARY OF THE INVENTION

Therefore, an object of the present invention is to provide a fuzzy operation apparatus which can provide various fuzzy operators by combining basic operators, supplied in the form of hardware, with microprograms.

Another object of the present invention is to provide a fuzzy operation apparatus which performs fuzzy operations in parallel by sequentially connecting a plurality of fuzzy operation portions so that they form a network and defuzzifies in parallel each element of a fuzzy set, the results of the fuzzy operation being dispersed and stored in the fuzzy operation portions throughout the network.

To achieve the above objects, the inventive fuzzy operation apparatus comprises a fuzzy operation control means for controlling fuzzy operations and defuzzification operations; and a plurality of fuzzy operation means for performing fuzzy operations and defuzzification operations in accordance with control signal from said fuzzy operation control means; wherein said fuzzy operation control means and said plurality of fuzzy operation means are connected sequentially in order to form a ring structure.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Embodiments of the invention will now be described with reference to the accompanying drawings.

Figure 2:
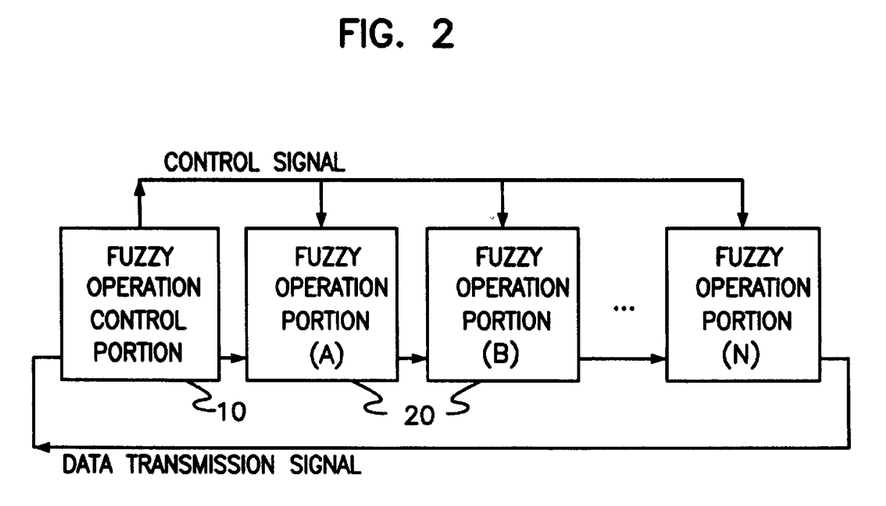
FIG. 2 is a block diagram illustrating a fuzzy operation apparatus in accordance with the present invention.
Figure 3:
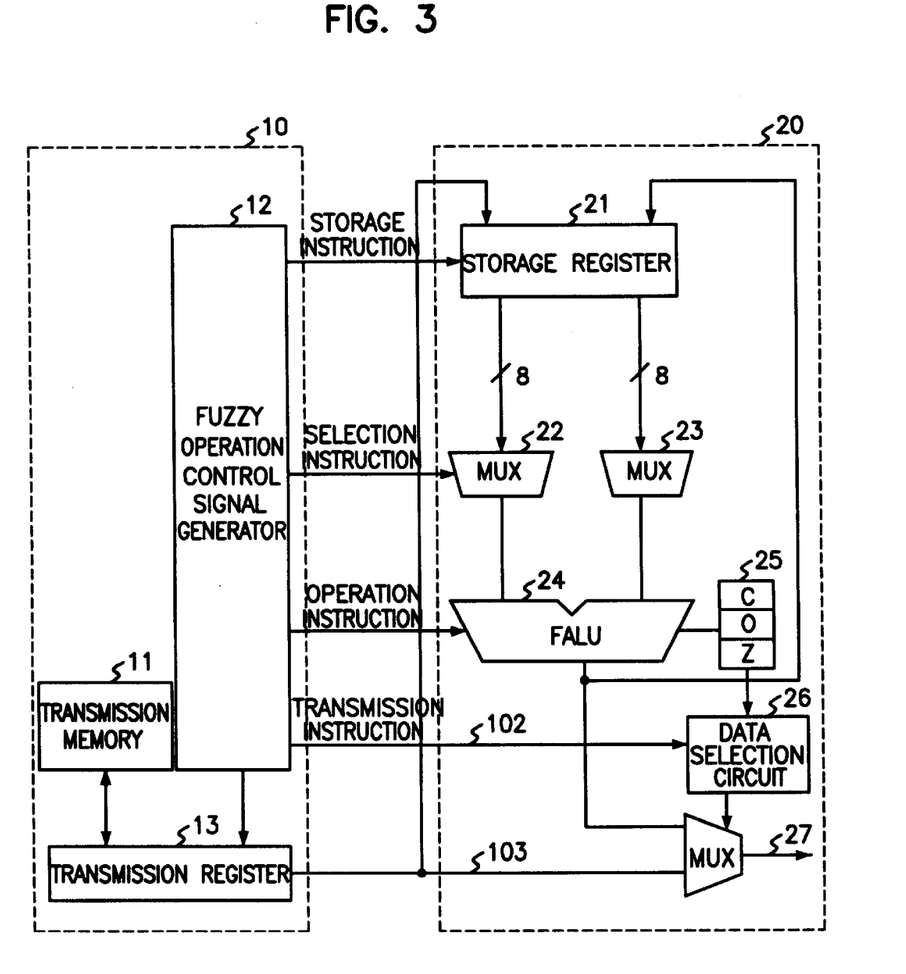
FIG. 3 is a detailed diagram of the fuzzy operation control portion and the fuzzy operation portion in the FIG. 2.

FIG. 2 shows the structure of a fuzzy operation apparatus in accordance with the present invention, and FIG. 3 shows the detailed structure and connection of the fuzzy operation control portion 10 and the fuzzy operation portion 20 in FIG. 2.

Figure 4:
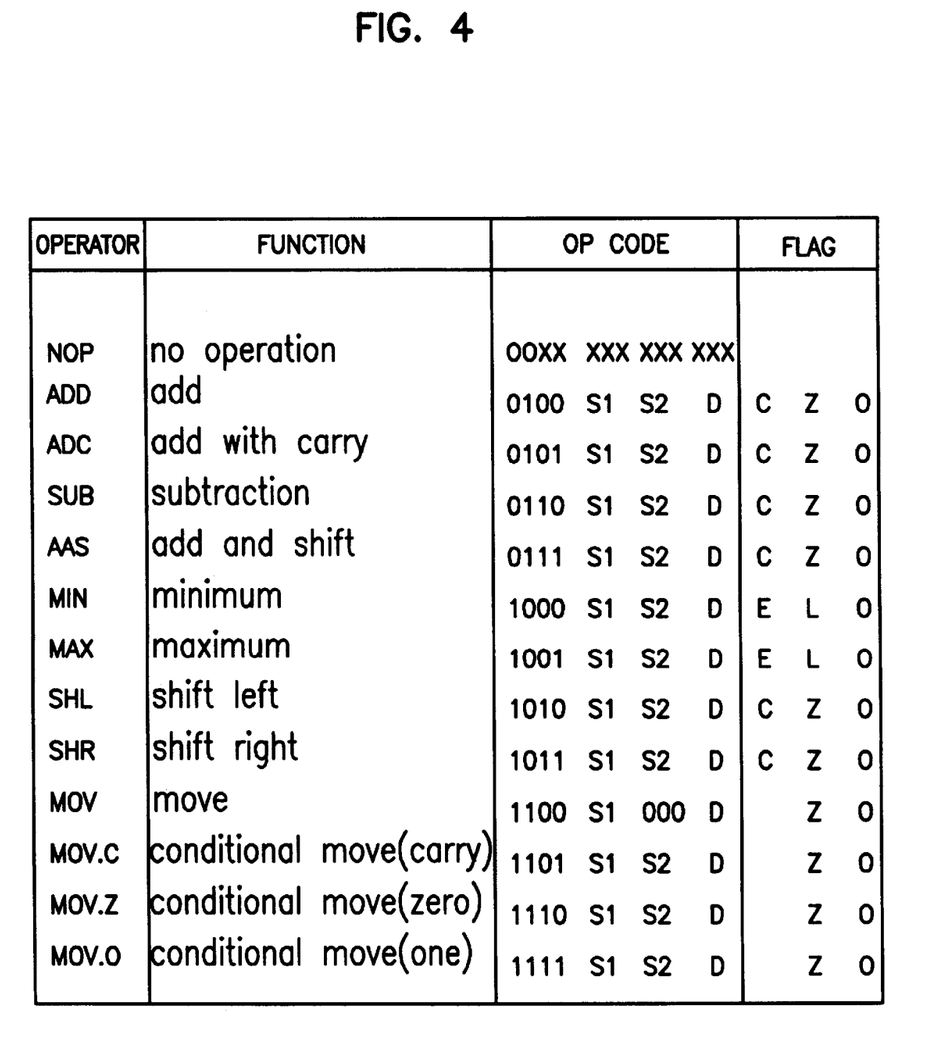
FIG. 4 is a diagram illustrating basic fuzzy operators of the fuzzy operation apparatus in accordance with the present invention.
Figure 5:
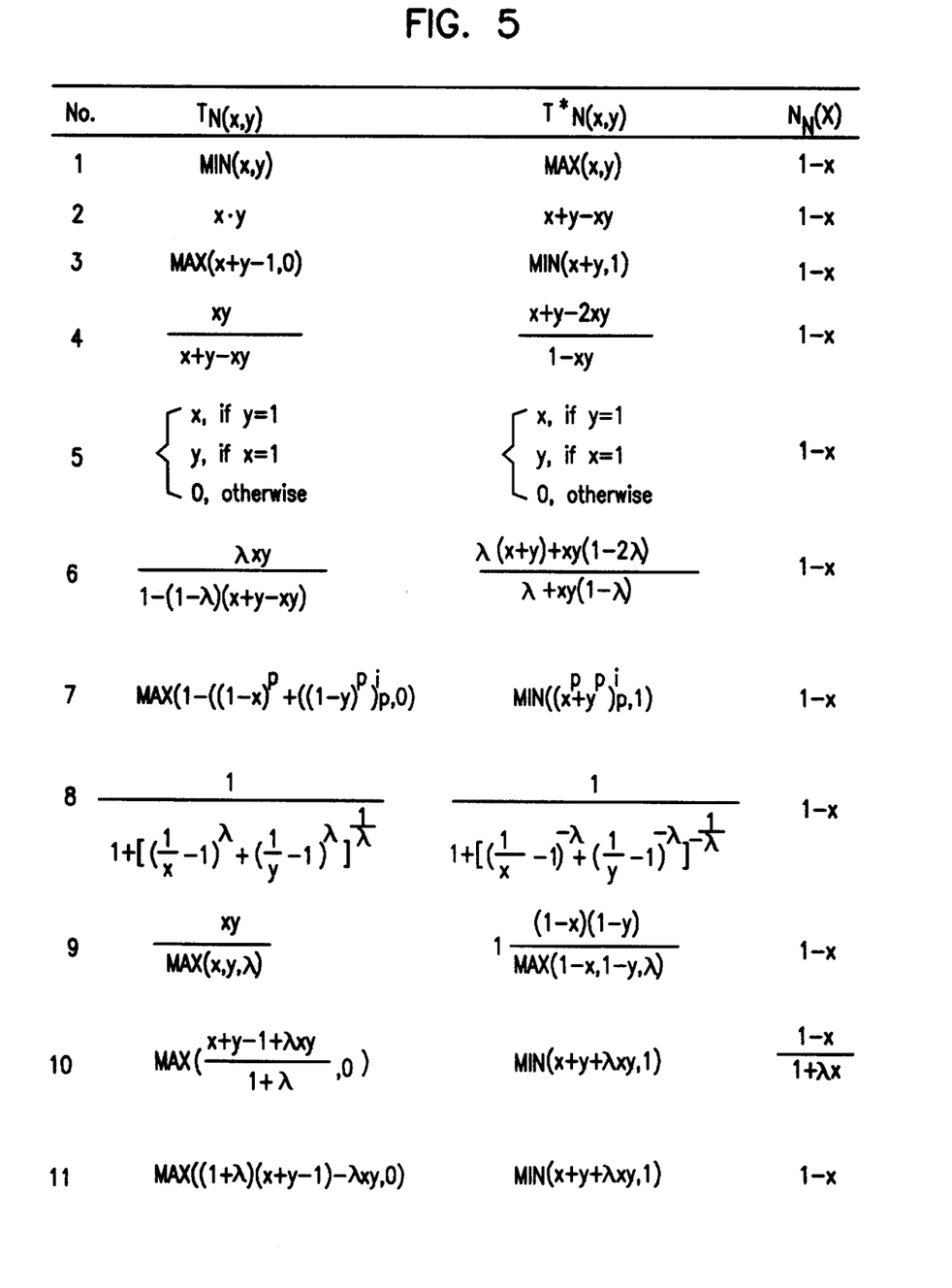
FIG. 5 is a diagram illustrating fuzzy operators generated by combining the basic operators in the FIG. 4.
Figure 6:
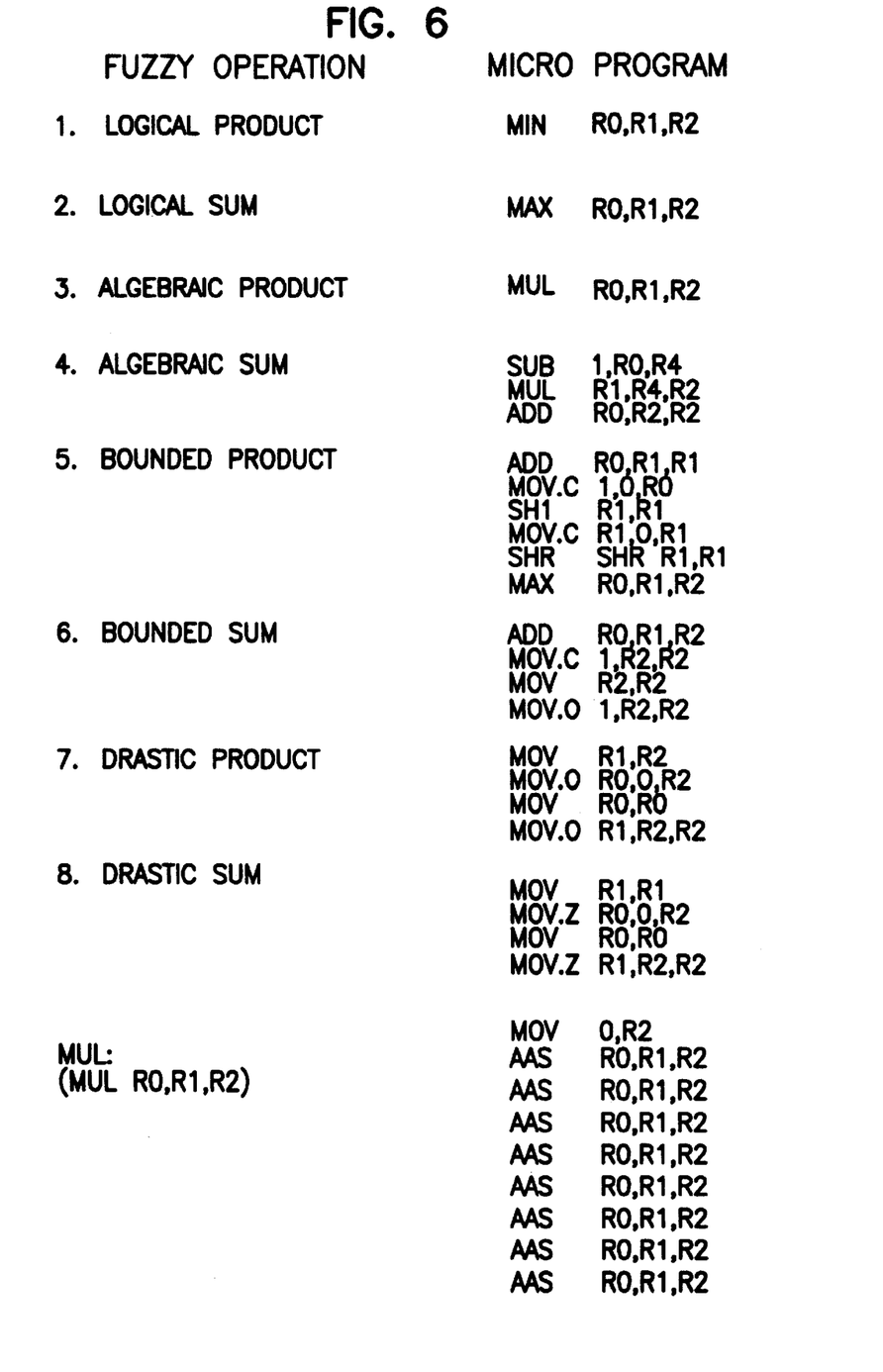
FIG. 6 is a diagram illustrating microprograms for providing the fuzzy operators in the FIG. 5.
Figure 7:
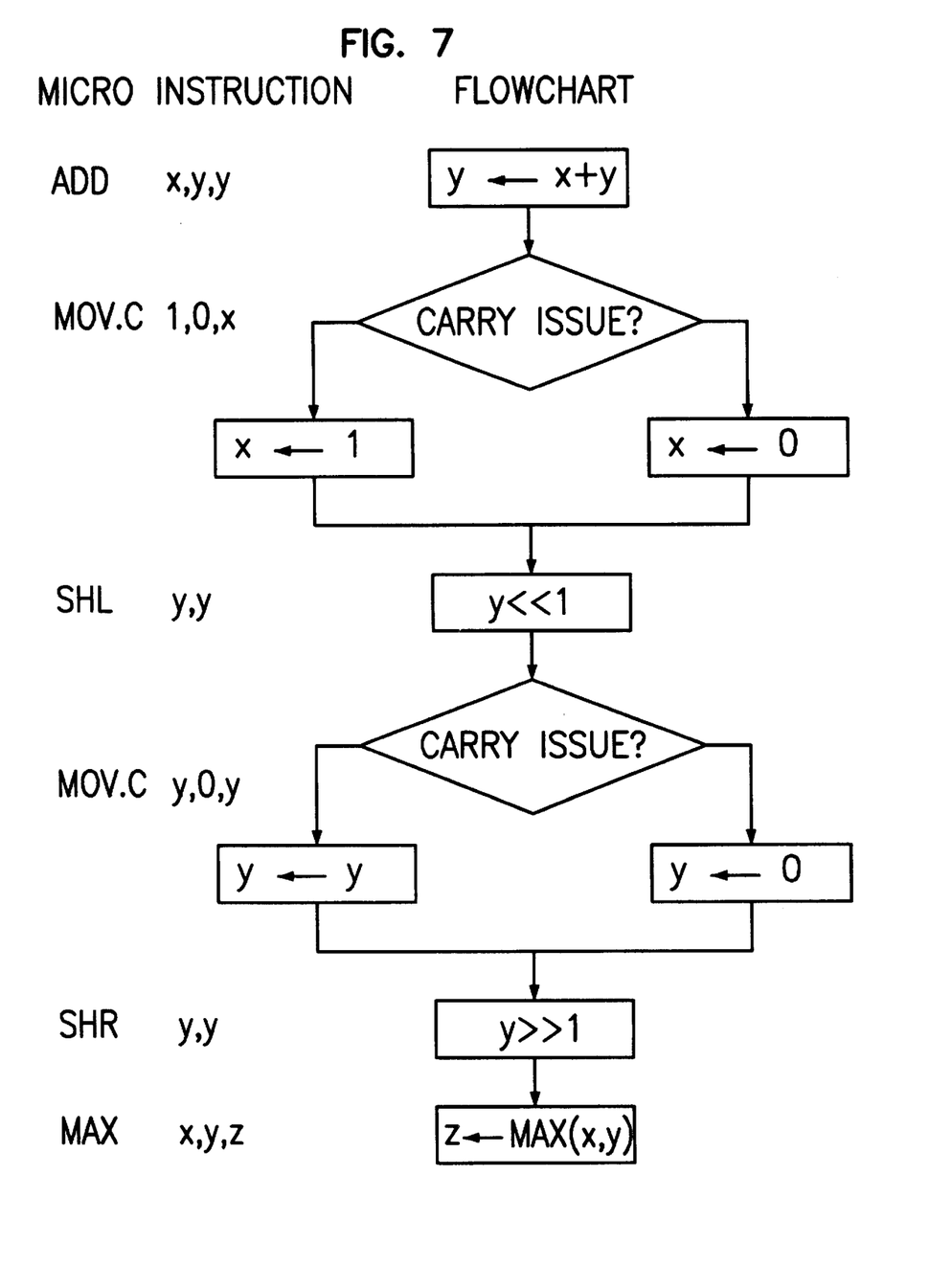
FIG. 7 is a flowchart illustrating the generation of a new fuzzy operator by combining the basic fuzzy operators.

A FALU(Fuzzy Arithmetic Logic Unit) 24 provides fuzzy operators shown in FIG. 4, and FIG. 5 shows examples of operators generated by combining basic operators of FIG. 4. FIG. 6 shows microprograms for providing fuzzy operators in FIG. 5 For example, a comparatively complicated operator bounded product (MAX(x+y−1, 0)) is described in the following:

Two multiplexers 22 and 23 provide input values x and y stored in a storage register 21 to the FALU 24, in accordance with a selection instruction outputted from a fuzzy operation control signal generator 12. The input value is between 0 and 1 logically, but the input value of the FALU is divided as the value between 0x00~0x80 by 128 steps.

The result of the operation, when the sum of x and y is greater than 1, is x+y−1, and when the sum is less than 1, the result is 0. When performing this, the FALU checks whether or not the result is greater than 1, after the summation of x and y, in accordance with operation instructions of the fuzzy operation control signal generator 12. Since is a partial result, the value of x+y, is between 0×00 and 0×100 (between 0 and 2 in decimal number), 0×100 is stored as 0×00 in the 8 bit storage register 21 of the fuzzy operation portions 20, and this time a carry flag occurs. Therefore, when the check result of a carry flag in a status flag is 2, it must be processed in a separate way.

When the medium result is 2, the present invention always makes the final result 1 by using 0 instead of 1 in the last max operation.

The method used when a value of x+y is greater than 1 is to left shift the value, to store the most left bit in the carry flag, and to check it. When it is 1, this means that the value of x+y is greater than 1, and when it is 0, this means that the value is less than 1.

When a partial summation value is greater than 1, it stores a value of x+y−1 by 1 bit right shift, and when the value is less than 1, it stores a value of 0. The final result can be obtained by performing max operation of two stored values.

If the fuzzy operation control signal generator 12 applies operation instructions to a plurality of fuzzy operation portions 20, each fuzzy operation portion 20 processes data stored in its storage register 21 in accordance with the instructions.

When fuzzy operations are terminated, for using a fuzzy set followed by fuzzy inference as a control input of the system, a defuzzification operation which makes the value of the fuzzy operations one representative value is performed.

Since most of fuzzy operations are on the fuzzy sets, each fuzzy operation portion 20 can store and process elements of the fuzzy sets in its storage registers 21, such that data transmission to other fuzzy operation portions is not needed.

However, since a defuzzification operation is an operation between scattered data in fuzzy operation portions 20, data transmission between fuzzy operation portions 20 is needed.

In that case, the invention connects the fuzzy operation control portion 10 and a plurality of fuzzy operation portions by a network, thereby making a ring structure. Data transmission is carried out in one direction, and data transmitted from the fuzzy operation control portion 10 returns back to the fuzzy operation control portion 10 through a plurality of fuzzy operation portions 20.

A transmission register 13 transmits data stored in transmission memory 11 to fuzzy operation portion 20 in accordance with a control signal from the fuzzy operation control signal generator 12, or stores the defuzzification operation results transmitted from the fuzzy operation portion 20.

The invention has a broadcasting function which transmits the data of the fuzzy operation control portion 10 to all the fuzzy operation portions 20, and a communication function which communicates the data between fuzzy operation portions 20 of nodes.

Each fuzzy operation portion 20 stores data from the previous fuzzy operation portion 20 in its storage register 21 in accordance with the store instruction of the fuzzy operation control signal generator 12.

One of the data transmitted from the previous fuzzy operation portion 20 and the data stored in its storage register 21 is outputted to the next fuzzy operation portion 20 selectively in accordance with transmission instructions.

If all fuzzy operation portions 20 select and output the data inputted from outside, a broadcasting function in which data from fuzzy operation control portion 10 is transmitted to each fuzzy operation portion, is performed.

The instruction execution time is the same as that obtained by the product of the data transmission time by the number of fuzzy operation portions 20. When there is a problem caused by the increase of fuzzy operation portions 20 making the execution time impossible to be within one cycle, the present invention iterates the same instruction until the data from the fuzzy operation control portion 10 arrives in the last fuzzy operation portion 20.

Also, a fuzzy operation portion 20, wanting to transmit data, transmits the data in its storage register to the next fuzzy operation portion 20. All fuzzy operation portions 20 are provided the data, such that communications are performed between fuzzy operation portions 20 by storing them in its storage register 21.

All fuzzy operation portions 20 perform the same operations in accordance with operation instruction from the fuzzy operation control portion 10, and each data selection circuit 26 of the fuzzy operation portion 20 works at the same time in accordance with transmission instructions from the fuzzy operation control portion 10. The data selection, circuit 26 determines the output of the fuzzy operation portion 20 in accordance with status flags 25.

Figure 8:
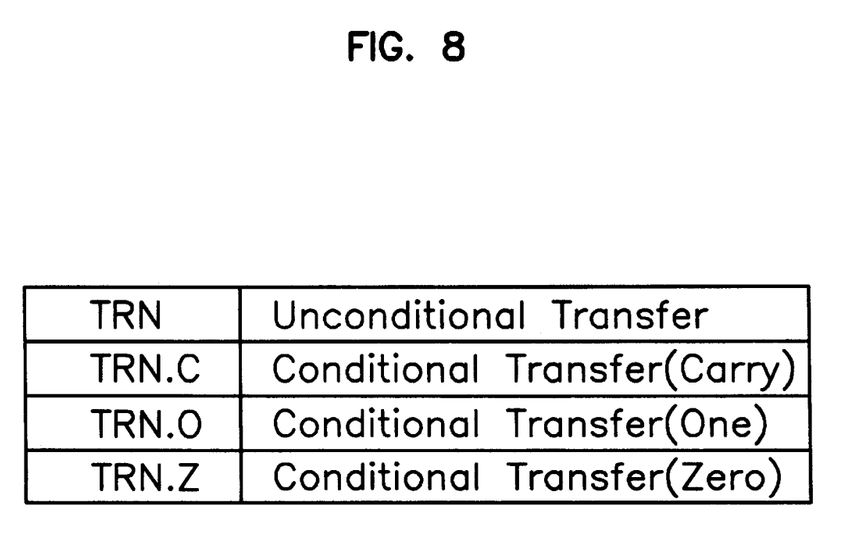
FIG. 8 is a diagram illustrating instructions used in the fuzzy operation control portion at defuzzification process.

FIG. 8 shows instructions generated from fuzzy operation control portion 10. TRN is an instruction which transmits data stored in a storage register, and TRN.C, TRN.0 and TRN.Z are instructions which select transmission data according to a status flag.

A status flag C describes whether a carry issues or not, 0 describes that an element value of the fuzzy set is 1, and Z describes that an element value of the fuzzy set is 0.

Status flags are used with a different meaning in the comparison operation. When the input value of x is equal to the input value of y, the status carry is set as C. When the input value of x is less than the input value of y, it is set as 0, and when the input value of x is greater than the input value of y, it is set as Z. This is used when different data are transmitted in accordance with a comparison result on defuzzification algorithm.

Figure 9:
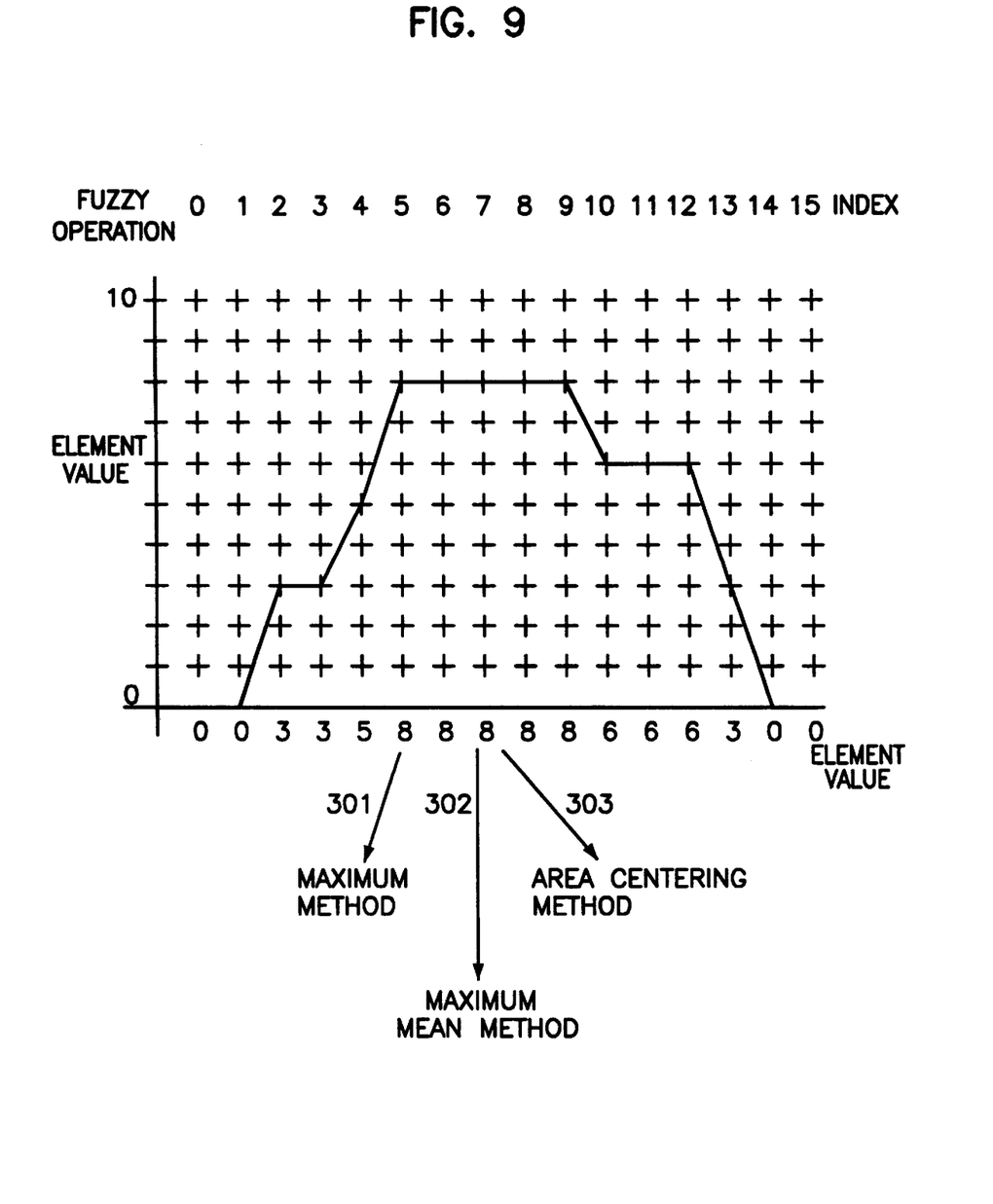
FIG. 9 is a diagram explaining a defuzzification method.
Figure 10:
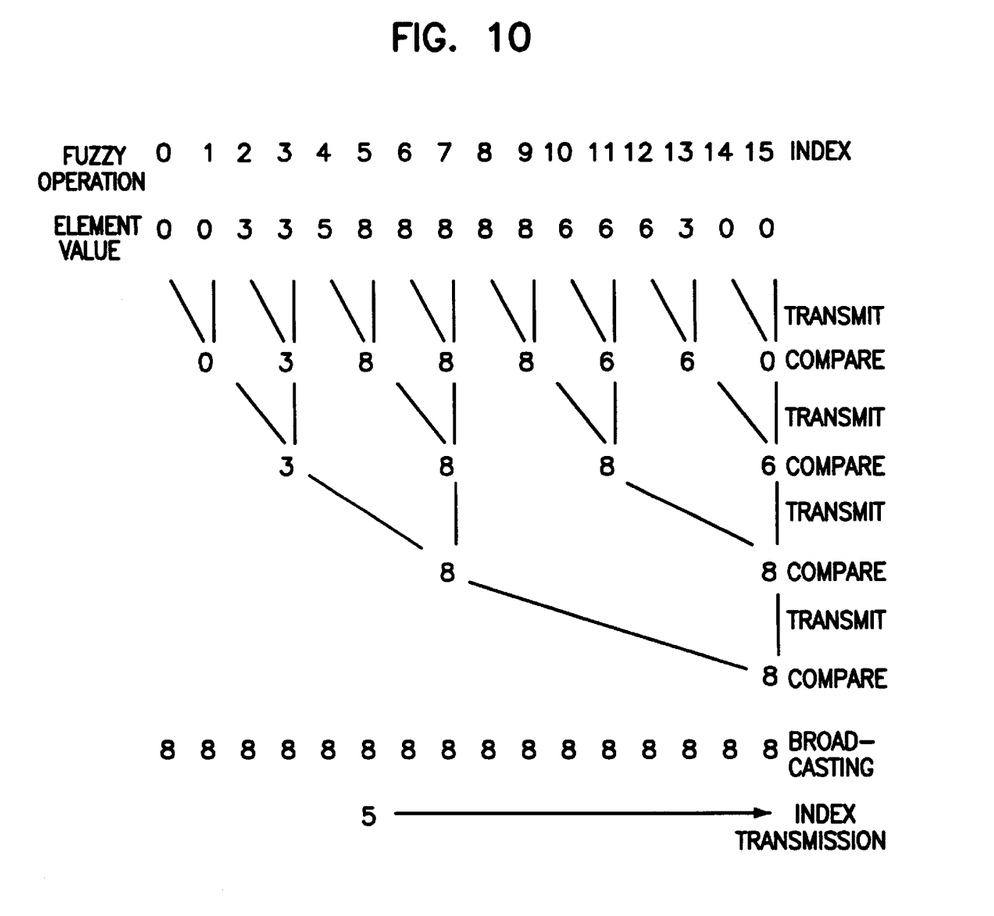
FIG. 10 is a diagram showing an example of the defuzzification process by the maximum method.

The defuzzification operation is an operation which finds one representative point of a fuzzy set. There are three defuzzification methods, one is the maximum method which finds the maximum value of the elements of a fuzzy set, another is the MOM (Mean of Maximum) method which finds the mean value of elements having maximum value, the last one is the MOA(Middle of Area) method which finds the middle point in the area of the element values.

When the number of elements of a fuzzy set is 16, and that of FALU is 16, each FALU has an index which points to its location. In the other words, a first FALU with index 0 has the first value of fuzzy set 0.

Since the maximum method finds the maximum value of the elements of the fuzzy set, it finds one value between index 5 and index 9.

Since the MOM(Mean of Maximum) method finds a mean location of elements having maximum value, it may find index 5 (the first one) and index 9 (the last one), sum the two values, and divide by 2, the resulting value designating the mean location.

The defuzzification result using the MOA(Middle of Area) method is index 7, which means the value of left and right elements centering this location are equal.

Figure 11:
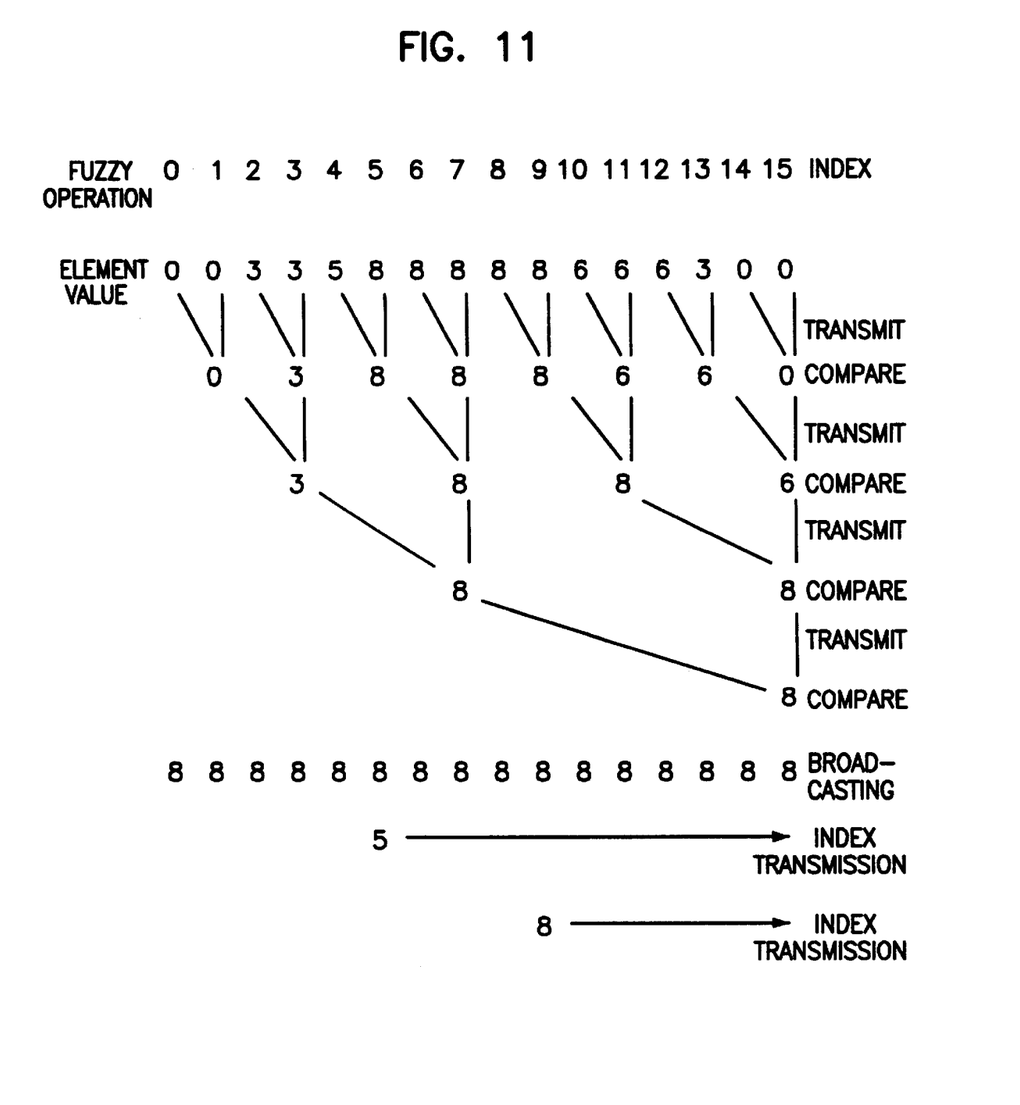
FIG. 11 is a diagram showing an example of the defuzzification process by the MOM(Mean of Maximum) method.

FIG. 11 shows examples illustrating the procedure in accordance with the maximum method and the MOM(Mean of Maximum) method, in which each element is compared with others and so the maximum value is transmitted to the fuzzy operation control portion 10. The maximum value transmitted is broadcast to all fuzzy operation portions 20, each fuzzy operation portion compares it with its own value, and when the two values are equal, transmits its index to the fuzzy operation control portion 10, such that this value is a location of an element having the maximum value of the fuzzy set.

Figure 12:
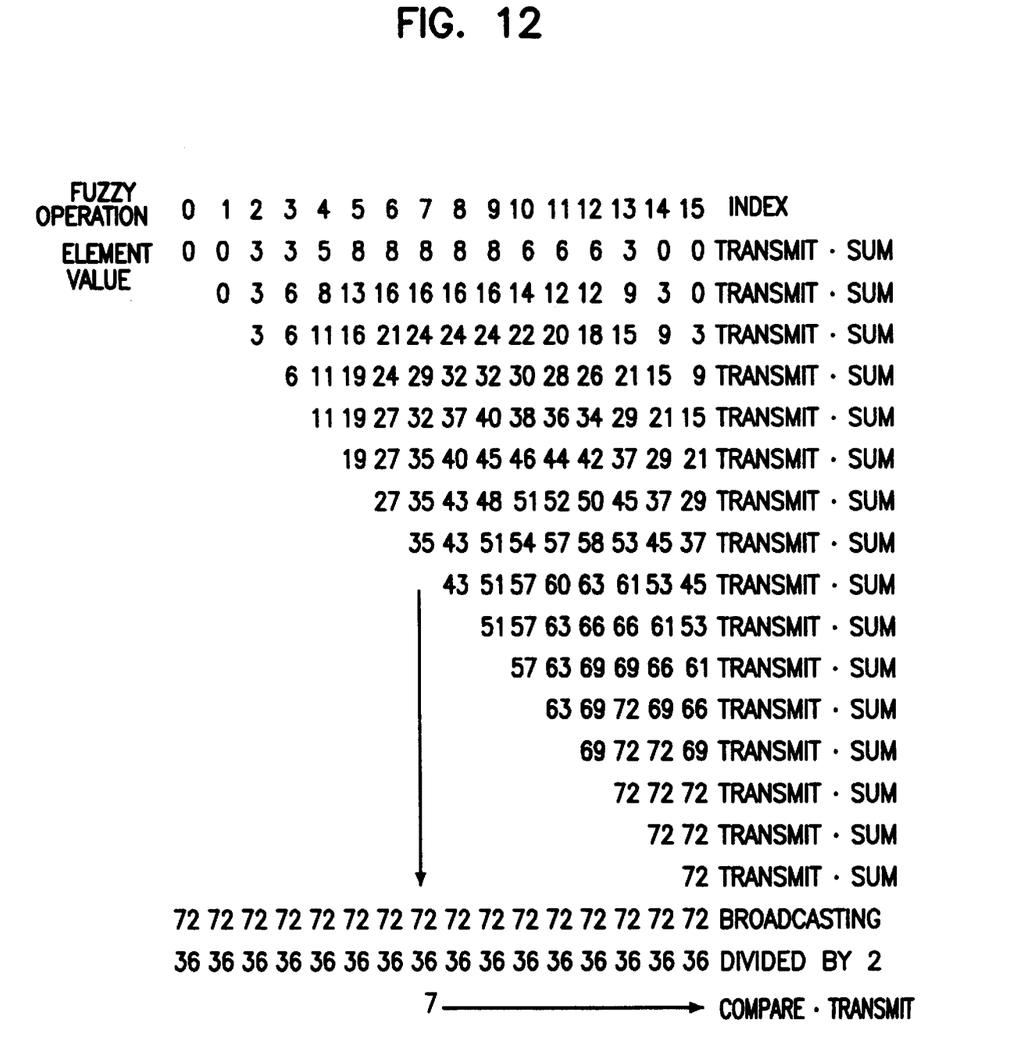
FIG. 12 is a diagram showing an example of the defuzzification process by the MOA(Middle of Area) method.

FIG. 12 describes the defuzzification operation using the MOA (Middle of Area) method. Each fuzzy operation portion 20 sums the value transmitted from the left operation portion and its value, and transmits the resulting value of the right operation portion. Each operation portion has the summation value of all neighboring elements by iteration of performing this operation as many times as the number of the elements of the fuzzy set.

Therefore, the first fuzzy operation portion keeps its own value, but the last operation portion has the total summation value of all the elements. The total summation value means the area of the fuzzy set. Since the center of the area is the location of the operation portion having a value nearest one half of the area, the area value is divided by 2 in the fuzzy operation control portion 10 and broadcast to all operation portions.

Similar to the above mentioned method, data broadcast from the fuzzy operation control portion 10 is supplied to each fuzzy operation portion and each operation portion compares the transmitted data with its own data. If the transmitted data is greater than its own value, each operation portion transmits its index, if not, it transmits the index; from the previous operation portion. In FIG. 12, the area value is 72, the center of the area is index 7 which is nearest 36.

The present invention provides various operators by combining them with microprograms, such that its hardware configuration is simple.

Also, the present invention establishes a net-work between fuzzy operations portions, performs fuzzy operation in parallel at a plurality of fuzzy operation portions, and defuzzifies each element of the fuzzy set dispersed and stored in the fuzzy operation portions, such that the defuzzification speed is fast. Also, since there is no need for an exclusive defuzzification processor, the cost of the system is low.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A fuzzy operation apparatus comprising:

a plurality of fuzzy operation means connected in series, for performing fuzzy operations and defuzzification operations; and a fuzzy operation control means coupled to said plurality of fuzzy operation means for controlling said plurality of fuzzy operation means, wherein said fuzzy operation means and said fuzzy operation control means are connected in a ring network to transmit data unidirectionally to an adjacent one of the plurality of fuzzy operation means and the fuzzy operation control means, and said fuzzy operation means are connected in parallel with said fuzzy operation control means to receive control signals from said fuzzy operation control means.

2. A fuzzy operation apparatus in accordance with claim 1, wherein said fuzzy operation means are controlled so as to combine basic operators to produce various operators in accordance with said fuzzy operation control means.

3. A fuzzy operation apparatus in accordance with claim 1, wherein said fuzzy operation control means comprises:

a fuzzy operation control signal generating means for generating a control output signal to control the fuzzy and defuzzification operations; and a transmission register for transmitting data stored in a transmission memory to the fuzzy operation means in accordance with an output signal from said fuzzy operation control signal generating means, and for storing a defuzzification operation value resulting from said fuzzy operation means.

4. A fuzzy operation apparatus in accordance with claim 3, wherein said fuzzy operation means comprises:

a storage register for storing a medium value of operations in accordance with the control output signal from said fuzzy operation control means;

a fuzzy arithmetic and logical unit for performing a fuzzy operation after receiving data stored in said storage register in accordance with the control output signal from said fuzzy operation control means;

a status flag for describing the status of said fuzzy operating means; and a selecting means operable by said fuzzy operating means so as to selectively output data from the storage register and data received from outside, in accordance with said status flag.

5. A fuzzy operation apparatus, comprising:

fuzzy operation units to perform fuzzy operations and defuzzification operations in accordance with a control signal; and a fuzzy operation controller supplying the control signal to the fuzzy operation units to control fuzzy operations and defuzzification operations in the fuzzy operation units, the fuzzy operation units and the fuzzy operation controller being sequentially connected to form a ring network for unidirectional data transfer, the control signal being received in parallel by the fuzzy operation units from the fuzzy operation controller, and the fuzzy operation units connected to perform defuzzification in parallel with other fuzzy operation units.

* * * * *